United States Patent [19]

Lanik

[11] 3,844,821

[45] Oct. 29, 1974

[54] GLASS FIBER REINFORCED ELASTOMERS

[75] Inventor: John H. Lanik, North Smithfield, R.I.

[73] Assignee: Owens-Corning Fiberglass Corporation, Toledo, Ohio

[22] Filed: Apr. 14, 1972

[21] Appl. No.: 244,191

[52] U.S. Cl. ............... 117/72, 57/140 G, 57/153, 117/126 GB, 117/161 UT, 260/29.3, 260/845, 260/846
[51] Int. Cl... B32b 17/04, B32b 17/10, C08g 37/20
[58] Field of Search... 117/126 GB, 161 A, 161 UT, 117/72

[56] References Cited
UNITED STATES PATENTS

| | | | |
|---|---|---|---|
| 3,409,577 | 11/1968 | Wong et al. | 117/126 GB |
| 3,424,608 | 1/1969 | Marzocchi et al. | 117/126 GB |
| 3,567,671 | 3/1971 | Janetos | 117/126 GB |
| 3,620,701 | 11/1971 | Janetos | 117/126 GB |
| 3,718,449 | 2/1973 | Fahey | 117/126 GB |
| 3,755,009 | 8/1973 | Uffner | 117/126 GB |

*Primary Examiner*—William D. Martin
*Assistant Examiner*—William H. Schmidt
*Attorney, Agent, or Firm*—Carl G. Staelin; John W. Overman; Keith V. Rockey

[57] ABSTRACT

This invention is addressed to the improvement in the bonding relationship between glass fibers and elastomeric materials with which the glass fibers are combined in the manufacture of glass fiber reinforced elastomeric products, wherein individual glass fibers are coated or bundles of glass fibers are impregnated with a composition containing a resorcinol-aldehyde resin component, an elastomer component and a terpolymer of acrylonitrile, butadiene and styrene. It has been found that the presence of the terpolymer significantly reduces the track of the treated glass fibers in the green or uncured state. The coated glass fibers may be subsequently treated with a dialkyl ester of phthalic acid.

12 Claims, 4 Drawing Figures

PATENTED OCT 29 1974 3,844,821

GLASS FIBER REINFORCED ELASTOMERS

This invention relates to glass fiber-elastomeric products, and more particularly to the treatment of glass fibers and compositions in the treatment of glass to facilitate the combination of glass fibers with elastomeric materials such as the manufacture of glass fiber-reinforced elastomeric products.

The term "glass fibers", as used herein is intended to refer to and include (1) continuous fibers formed by the rapid attenuation of hundreds of streams of molten glass and to strands formed when such continuous glass fiber filaments are gathered together in forming; and to yarns and cords formed by twisting and/or plying a number of strands together, and to woven and non-woven fabrics which are formed of such glass fiber strands, yarns or cords, and (2) discontinuous fibers formed by high pressure steam or air or other attenuating force onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

As used herein, the term "elastomer" is intended to mean and include natural rubber in the cured or uncured stage, vulcanized or unvulcanized stage, and synthetic organic elastomeric materials such as nitriles, acrylics and esters and terpolymers thereof with styrene and acrylonitriles; styrene and vinyl pyridine; and rubbers as represented by butadiene polymers and copolymers with monoolefins such as butadiene-styrene copolymer, butadiene-acrylonitrile copolymers, butadiene-styrene vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2–12 carbon atoms, and polysulfone rubbers.

It is now well known to combine glass fibers with elastomeric materials in the manufacture of glass fiber-reinforced elastomeric products, such as driving belts, timing belts, pneumatic tires, etc. One of the problems which has been encountered in such combinations of glass fibers with elastomeric products is the problem of securely anchoring the glass fiber surfaces to the elastomeric material in which the glass fibers are distributed. It is believed that this problem stems in part from the fact that the glass fibers are completely smooth, rod-like members and in part from the fact that the glass fiber surfaces are highly hydrophilic in nature, thereby resulting in the formation of a thin but tenacious film of water on the glass fiber surfaces which serves to destroy any bond, chemical or physical, which would otherwise be formed between the glass fiber surfaces and the elastomeric material with which the glass fibers are combined.

To minimize the problems of binding the glass fiber surfaces to the elastomeric materials, it has been the practice in the manufacture of glass fiber-reinforced elastomeric products to make use of glass fibers in the form of individual glass fibers having a coating on the surfaces thereof to intertie the individual glass fibers to the elastomeric material in which the glass fibers are distributed, or preferably glass fibers in the form of yarns, cords or fabrics, hereinafter referred to as bundles, containing an impregnant therein which also serves to intertie the glass fiber bundles to the elastomeric material in which the bundles are distributed.

Numerous compositions for use in the treatment of glass fibers in the form of individual glass fibers, but preferably bundles of glass fibers, are now well known to those skilled in the art. Most of such compositions have been formulated to include a resorcinol-aldehyde resin component and an elastomer component. For example, a glass fiber treating composition formulated of a blend or combination of a resorcinol-aldehyde resin and an elastomer latex such as natural rubber latex has been used.

Another suitable composition for use in the treatment of glass fibers is disclosed in U.S. Pat. No. 3,424,608, wherein there is described a composition formulated to include a resorcinol-aldehyde resin component and an elastomer component comprising a mixture of a vinyl pyridine-butadiene-styrene terpolymer, neoprene rubber and butadiene rubber.

In U.S. Pat. No. 3,567,671, description is made of a composition for use in the treatment of glass fibers which is formulated to include a resorcinol-aldehyde resin, a vinyl pyridine butadiene-styrene terpolymer, an incompatible wax and at least one of an acrylic resin, a copolymer of vinyl chloride and vinylidene chloride or a carboxylated butadiene-styrene copolymer. Further improvements in compositions of the general type disclosed in the preceding patent have been developed wherein it was found that certain dicarboxylated butadiene-styrene resin latices as the carboxylated resin component provide even greater adhesion between the treated glass fibers and elastomers with which the treated glass fibers are combined in the manufacture of glass fiber-reinforced elastomeric products.

While each of the compositions described above represent a significant improvement in the art of integrating glass fibers with elastomeric materials, each suffers from the disadvantage that the treated glass fibers are frequently excessively tacky in the green or uncured and/or unvulcanized state. As will be appreciated by those skilled in the art, this green tack makes it more difficult to further process the treated glass fibers because seizures between the treated glass fibers tend to occur. Such seizures are particularly troublesome in the processing of the treated fibers or bundles of fibers into yarns, cords, woven or non-woven fabrics and the like, or in the weaving or otherwise arranging the treated glass fibers into the form desired for use as reinforcement for elastomeric materials in the manufacture of glass fiber-reinforced elastomeric products.

It is accordingly an object of the present invention to provide a composition and method for use in the treatment of glass fibers to produce treated fibers substantially free of tackiness in the green or uncured and/or unvulcanized state and having improved processing characteristics.

It is a further object of the invention to provide a composition for use in the treatment of glass fibers which is capable of substantially minimizing the green tack of the treated fibers without detrimentally affecting the adhesion characteristics between glass fibers and elastomeric materials, and which is characterized by improved chemical and mechanical stability to provide a clean system.

It is a related object of the invention to provide individual glass fiber filaments and bundles of glass fibers which have been treated with the composition of the invention.

These and other objects and advantages of the invention will appear more fully hereinafter, and, for purposes of illustration and not of limitation, an embodiment of the invention is shown in the accompanying drawings in which.

Figure 1:
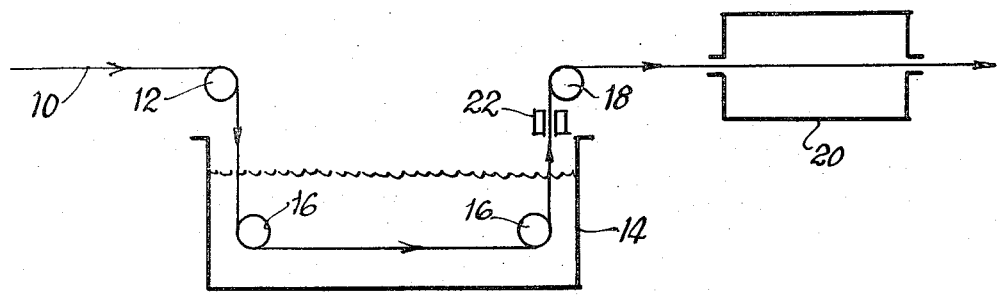
FIG. 1 is a schematic flow diagram of a method of impregnating bundles of glass fibers in accordance with the invention.

The concepts of the present invention reside in the discovery that the green tack of glass fibers treated with a composition formulated to include a resorcinol-aldehyde resin component and an elastomer component can be significantly reduced by adding to the treating composition a latex of an acrylonitrile-butadiene-styrene terpolymer. It has been found that the acrylonitrile-butadiene-styrene terpolymer reduces green tack without adversely affecting the adhesion between the treated glass fibers and elastomeric materials with which they are combined in the manufacture of glass fiber-reinforced elastomeric products. In addition, the acrylonitrile-butadiene-styrene terpolymer serves to provide a stable composition having less tendency to scum during the treatment of glass fibers.

As the acrylonitrile-butadiene-styrene terpolymer, use can be made of a number of terpolymers commercially available. For example, use can be made of terpolymers marketed under the trade marks SR 5815, SR 1594 and SR 5814 by the Firestone Tire and Rubber Company; Hycar 1551, Hycar 1571 and Hycar 1577 from the Goodrich Chemical Company; and Chemigum 236, Chemigum 246, Chemigum 248, Chemigum 250, and Chemigum 520 from the Goodyear Tire and Rubber Co.

It has been found that best results are frequently obtained when the terpolymer contains a relatively large amount of acrylonitrile and styrene relative to the butadiene. It is sufficient that the terpolymer contain 5 to 25 parts by weight of butadiene per 100 parts by weight of terpolymer, and preferably 10 to 20 parts by weight butadiene. The relative proportions of acrylonitrile and styrene can vary widely and are not critical to the practice of the invention. Normally, the weight ratio of styrene to acrylonitrile ranges from 0.9 to 2.0. The Firestone terpolymer SR 5815 contains about 15 parts by weight butadiene, 50 parts by weight styrene and 35 parts by weight acrylonitrile, and is frequently preferred.

The treating composition to which the acrylonitrile-butadiene-styrene terpolymer is added can be any of the treating compositions containing a resorcinol-aldehyde resin component and one or more elastomer components, as represented by those treating compositions described above. Generally, such compositions include from 1 to 50 parts by weight of the resorcinol-aldehyde resin and preferably 5 to 25 parts by weight resorcinol-aldehyde resin, per 100 parts by weight of the elastomer.

Because the acrylonitrile-butadiene-styrene terpolymer is compatible with systems formed of a resorcinol-aldehyde resin component and one or more elastomer components and does not adversely affect the bonding characteristics of the treated glass fibers with elastomeric materials, the acrylonitrile-butadiene-styrene terpolymer can be added to the resorcinol-aldehyde resin-elastomer system over a wide range of proportions. It has been found that best results are generally obtained when the terpolymer is employed in an amount within the range of 1 to 50 parts by weight, and preferably 5 to 25 parts by weight, of the terpolymer per 100 parts by weight of the total of the resorcinol-aldehyde resin and the elastomer on a solids basis.

In accordance with a further embodiment of the invention, it has been found that the processing characteristics of glass fibers treated in the practice of this invention can be further improved by treatment of the glass fibers coated, or bundles of glass fibers impregnated, with the composition of the invention with a dialkyl ester of phthalic acid. Without limiting this embodiment of the invention as to theory, it is believed that the phthalate esters serve to impart improved lubricity and pliability to the treated glass fibers. It has been observed that subsequent treatment of the glass fibers treated with the composition of the invention with the phthalate esters greatly facilitates braiding of the treated fibers.

The phthalate esters preferred for use in the practice of the invention include the dialkyl esters in which the alkyl groups each contain four to 20 carbon atoms and preferably six to 14 carbon atoms. Representative esters include dihexyl phthalate, diheptyl phthalate, didecyl phthalate, distearyl phthalate, etc. The phthalate ester can be conveniently applied to the treated glass fibers after the coating on the individual fiber filaments or the impregnant in the glass fiber bundle has dried, e.g. as the treated glass fibers exit from a drying oven. It is not necessary that the phthalate ester be applied as a continuous film on the treated fibers, although this is not disadvantageous. It is sufficient that the phthalate be applied to the surface of the treated fibers in an amount sufficient to lubricate the treated fibers. Best results are usually obtained when the ester is applied in an amount to form a continuous or discontinuous coating constituting from 0.01 to 1 percent by weight of the treated glass fiber system.

Having described the basic concepts of the invention, reference is now made to the following examples as illustrative of the preferred practice of the present invention in the formulation and use of compositions in the treatment of glass fibers in the form of bundles of glass fibers preferably, but not necessarily, having a thin size coating on the individual glass fiber filaments.

EXAMPLE 1

Using the procedure described in U.S. Pat. No. 3,567,671, the following composition is prepared:

|  | Parts by weight |
|---|---|
| Vinyl pyridine-butadiene-styrene terpolymer latex (42% solids) (Gentac FS - General Tire and Rubber Co.) | 900 |
| Resorcinol-formaldehyde resin (Penacolyte R-2170) (75% solids) | 48 |
| Vinyl chloride-vinylidene chloride copolymer latex (50% solids) (Dow Latex 874) | 350 |
| Microcrystalline paraffin wax (56% solids) (Vultex Wax Emulsion No. 5 of General Latices and Chemical Corp.) | 200 |
| Water to total solids content of 30% | |

Thereafter, the resulting composition is admixed with an acrylonitrile-butadiene-styrene terpolymer latex (SR 5815 from Firestone) to form the following impregnating composition:

Impregnating Composition

|  | Parts by weight |
|---|---|
| Vinyl pyridine-butadiene-styrene terpolymer latex | 900 |
| Resorcinol-aldehyde resin | 48 |
| Vinyl chloride-vinylidene chloride copolymer | 350 |
| Microcrystalline wax | 200 |
| Acrylonitrile-butadiene-styrene resin latex (38 % solids) | 100 |
| Water to total solids concent of 25% | |

Impregnation of a bundle of glass fibers, which may or may not contain a thin size coating of a conventional size composition such as one of those described in U.S. Pat. No. 3,424,608, can be made by conventional means for impregnation, such as by immersion of the bundles in a bath of the aqueous impregnating composition.

Referring more specifically to FIG. 1 of the drawing, a bundle 10 of sized or unsized glass fibers is advanced over a guide roller 12 for passage downwardly into the bath 14 containing the impregnating composition of Example 1. The bundle is then turned under a pair of rollers 16 to effect a sharp bend which operates to open the bundle to enable more complete penetration of the aqueous impregnating composition into the bundle of glass fibers. The impregnated bundle is then raised from the bath 14 for passage over a guide roller 18 into a drying oven 20, preferably in the form of an air drying oven maintained at a temperature within the range of 100° to 600° F to accelerate removal of the aqueous diluent and to set the impregnating material in situ in the glass fiber bundle.

It is sometimes desirable to pass the impregnated glass fiber bundle through a die 22 as it is raised from the bath for the purposes of removing excess impregnating composition from the bundle and working the solids of the impregnating composition into the bundle. However, with the impregnating compositions of this invention, it is frequently not necessary to make use of such a die although the use of the die is rarely undesirable.

Figure 2:
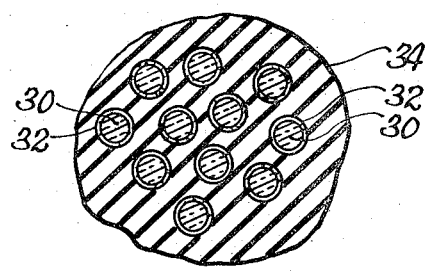
FIG. 2 is a cross-sectional view of a bundle of glass fibers treated in accordance with the method illustrated in FIG. 1.

The resulting bundle is shown in FIG. 2 and comprises a plurality of glass fibers 30 having an optional size coating 32 on the individual surfaces thereof and an impregnant 34 which completely penetrates the bundle. As is shown in this figure, the impregnant 34 serves to fill the interstices between the fibers and physically separate the fibers each from the other to provide a unitary bundle structure.

The glass fiber bundles impregnated with the compositions of the type shown in Example 1 are found to have drastically reduced tack as measured by a conventional tensiometer as compared to bundles impregnated with compositions formulated without the acrylonitrile-butadiene-styrene terpolymers.

In compositions as represented by Example 1, the components are preferably present in the following relative proportions (solids basis):

|  | Parts by weight |
|---|---|
| Resorcinol-aldehyde resin | 2 to 10 |
| Vinyl pyridine-butadiene-styrene terpolymer | 20 to 60 |
| Vinyl chloride-vinylidene chloride copolymer | 15 to 40 |
| Microcrystalline paraffin wax | 5 to 30 |
| Acrylonitrile-butadiene-styrene terpolymer | 1 to 35 |

The acrylonitrile-butadiene-styrene terpolymer is preferably employed in an amount within the range of about 1 to 50 parts by weight per 100 parts by weight of the resorcinol-aldehyde resin component and the vinyl-pyridine-butadiene-styrene terpolymer elastomer component, as indicated above.

In the composition of Example 1, the vinyl chloride-vinylidene chloride may be replaced in whole or in part by one of an acrylic resin latex and/or a carboxylated butadiene-styrene copolymer latex of the type described in U.S. Pat. No. 3,567,671, the disclosure of which is incorporated herein by reference.

EXAMPLE 2

Using the procedure described in Example 1, the following impregnating composition is formulated:

Impregnating Composition

|  | Parts by Weight |
|---|---|
| Vinyl pyridine-butadiene-styrene terpolymer latex (42% solids) | 900 |
| Resorcinol-formaldehyde resin latex (75% solids) | 50 |
| Vinyl chloride-vinylidene chloride copolymer latex (50% solids) | 290 |
| Acrylic resin (Rhoplex B85) (50% solids) | 60 |
| Microcrystalline wax (56% solids) | 180 |
| Acrylonitrile-butadiene-styrene terpolymer latex (38% solids) | 110 |

The balance of the composition is water and the amount of water is adjusted to provide a solids content of 10 to 50 percent by weight. Impregnation can be effected in accordance with the procedure described in Example 1; application of the impregnating composition is generally made in an amount sufficient to deposit in the glass fiber bundle any solids constituting 5 to 25 percent by weight of the glass fiber system.

EXAMPLE 3

This example illustrates the subsequent treatment of the impregnated bundles with a dialkyl phthalate ester.

Using the procedure illustrated in FIG. 1, a bundle of glass fibers is impregnated with the impregnating composition of Example 1. The drying oven 20 is maintained at a temperature of about 525° F and the dried, impregnated bundle leaving the oven is treated with molten dioctyl phthalate to improve the lubricity and pliability of the impregnated bundle.

Figure 3:
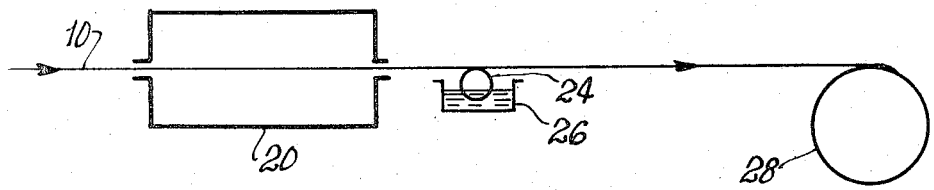
FIG. 3 is a schematic flow diagram of subsequent processing of the bundles impregnated in accordance with the method of FIG. 1 to apply a lubricant to the impregnated bundle in accordance with another embodiment of the invention.

Referring now specifically to FIG. 3 of the drawing as illustrative, the dried and impregnated bundle 10 is advanced through the drying oven 20 and is then passed in surface contact with a driven roller 24 partially immersed in a molten bath 26 of dioctyl phthalate. The roller 24 is constantly wet with the molten ester and is preferably, but not necessarily, driven in a direction opposite to the direction of advancement of the impregnated bundle 10 to at least partially coat the surface of the impregnated bundle with the dioctyl phthalate as determined by the rate of rotation of roller 24.

Thereafter, the impregnated bundle is exposed to ambient conditions to enable the phthalate ester to at least partially penetrate the impregnated bundle to fabricate the bundle. The impregnated bundle then has excellent lubricity for subsequent processing, such as braiding, weaving, twisting, plying, etc.

It has been found that the addition of an acrylonitrile butadiene-styrene terpolymer latex is likewise effective in substantially minimizing the tack of impregnating compositions formulated to include a resorcinol-aldehyde resin component, a vinyl pyridine-butadiene-styrene terpolymer elastomeric latex component, microcrystalline wax and a dicarboxylated butadiene-styrene resin latex.

Such compositions are represented by the following examples.

EXAMPLE 4

Impregnating Composition

| | Parts by weight |
|---|---|
| Resorcinol-formaldehyde resin latex | 2 to 10 |
| Vinyl pyridine-butadiene-styrene terpolymer latex | 20 to 60 |
| Dicarboxylated butadiene-styrene resin latex | 15 to 40 |
| Microcrystalline paraffin wax | 5 to 30 |
| Acrylonitrile-butadiene-styrene terpolymer latex | 1 to 35 |

Parts by weight in the above example are on a solids basis. The balance of the composition is water in an amount to provide a solids content of 10 to 50 percent by weight.

EXAMPLE 5

Impregnating Composition

| | Parts by weight |
|---|---|
| Resorcinol-formaldehyde resin latex (75% solids) | 50 |
| Vinyl pyridine-butadiene-styrene terpolymer latex (42% solids) | 900 |
| Dicarboxylated butadiene-styrene resin latex (50% solids) (Pliolite 4121 - Goodyear) | 450 |
| Microcrystalline paraffin wax (Emulsion 56% solids) | 200 |
| Acrylonitrile butadiene-styrene terpolymer latex (38 % solids) (SR5815) | 100 |

Application of the above composition to a bundle of sized or unsized glass fibers can be made in accordance with the method described in Example 1, either with or without subsequent treatment with a dialkyl phthalate as described in Example 3.

The addition of an acrylonitrile-butadiene-styrene terpolymer latex to reduce green tack can be carried out with respect to a variety of other impregnating compositions formulated to include a resorcinol-aldehyde resin component and an elastomer component. For example, the acrylonitrile-butadiene-styrene terpolymer can be used in combination with resorcinol-aldehyde elastomers as represented by the following examples.

EXAMPLE 6

| | Parts by Weight |
|---|---|
| Resorcinol-formaldehyde resin - natural rubber latex (38% solids) (Lotol 5440 - U.S. Rubber Co.) | 100 |
| Acrylonitrile-butadiene-styrene terpolymer latex (38% solids) (SR 5814) | 8 |

Suitable resorcinol-aldehyde resins and combinations thereof with natural rubber latex are marketed by the U.S. Rubber Company under the trade name "Lotol 5440." For the preparation of such systems, reference can be made to Canadian Pat. No. 435,754, in which there is described the reaction of resorcinol and a lower aldehyde (formaldehyde) in the presence of a substantial amount of lower alkyl primary and secondary amines for the purpose of stabilizing the reaction and the products formed, as well as a description of the combination of the resin formed with an alkaline elastomer latex such as a natural rubber latex. Normally, the combination of the resorcinol-aldehyde resin with natural rubber latex produces systems in which the resin component is present within the range of 1 to 50 parts by weight resin, and preferably 5 to 25 parts resin, per 100 parts by weight rubber on a solids basis.

In addition, the acrylonitrile-butadiene-styrene terpolymer of the invention can be used to reduce the green tack of impregnant systems of the type disclosed in U.S. Pat. No. 3,424,608, the disclosure of which is incorporated herewith by reference. Such a composition may be illustrated by the following example.

EXAMPLE 7

Impregnating Composition

| | Parts by weight |
|---|---|
| Resorcinol-aldehyde resin | 2 to 10 |
| Formaldehyde | 1 to 3 |
| Concentrated ammonium hydroxide | 2 to 5 |
| Vinyl pyridine-butadiene-styrene terpolymer latex | 15 to 50 |
| Neoprene rubber latex | 25 to 50 |
| Butadiene latex | 5 to 15 |
| Alkali metal hydroxide | 0.05 to 0.2 |
| Acrylonitrile-butadiene-styrene terpolymer latex | 2 to 62.5 |

The balance of the foregoing is water in an amount sufficient to provide the solids content. The parts by weight are shown as based on solids, and the amount of acrylonitrile-butadiene-styrene terpolymer is based on the total of the elastomer component (i.e., the vinyl pyridine-butadiene-styrene terpolymer, the neoprene and the butadiene) and the resorcinol-aldehyde resin component.

It is desirable to achieve as full impregnation as possible into the bundles of glass fibers to more effectively separate the fibers each from the other with the impregnating material since the solids are effective to cushion the fibers and to protect the fibers from destruction by mutual abrasion. The deeper the penetration, the more effective is the bond between the bundles of glass fibers and the elastomeric material with which the bundles of glass fibers are combined in the subsequent manufacture of glass fiber-elastomeric products.

The elastomeric material with which the impregnated bundle of glass fibers is combined constitutes a continuous phase. The elastomer constituting the continuous phase may be selected from elastomers of the type incorporated into the impregnating composition, or the elastomeric material may differ therefrom. The elastomer constituting a continuous phase can be employed in the cured or uncured stage or in the vulcanized or unvulcanized stage. It is believed that the tie-in between the impregnated bundle of glass fibers and the elastomer constituting the continuous phase occurs primarily during cure or vulcanization of the elastomeric materials in combination with the impregnated bundles.

More complete protection for the individual glass fibers and more complete coordination of the glass fibers with the elastomeric material constituting the continuous phase can be achieved when impregnating compositions of the type described above are modified for use as a size composition for application to individual glass fiber filaments, preferably in forming. For this purpose, treating compositions of the type described above are further diluted with water to provide a solids content within the range of 5–30 percent by weight and are formulated to include a glass fiber anchoring agent. Representative of suitable anchoring agents which can be used in the practice of this invention are the organo silicons, their hydrolysis products and polymerization products (polysiloxane) of an organo silane having the formula:

$$Z_{(4-n)}Si\ R_n$$

wherein Z is a readily hydrolyzable group such as alkoxy having 1–4 carbon atoms (e.g. methoxy, ethoxy, propoxy, etc.) or halogen, such as chlorine, $n$ is an integer from 1 to 3, and R is hydrogen or an organic group in which at least one R group is an alkyl group having 1–10 carbon atoms, such as methyl, ethyl, propyl, etc.; cycloalkyl having 4–8 carbon atoms, such as cyclopentyl, cyclohexyl, etc.; aryl having 6–10 carbon atoms, such as phenyl, naphthyl, benzyl, etc.; alkoxy alkyl, such as methyloxyethyl, etc.; alkenylcarbonyloxyalkyl, such as carbonylpropylmethoxy, etc.; as well as the amino, epoxy, mercapto and halogen derivatives of the foregoing groups.

Illustrative of suitable silanes are ethyltrichlorosilane, propyltrimethoxysilane, vinyl trichlorosilane, allyl triethoxy silane, cyclohexylethyltrimethoxy silane, phenyltrichlorosilane, phenyldimethoxysilane, methacryloxypropyltrimethoxy silane, gamma-aminopropyltriethoxy silane, beta-aminovinyldiethoxy silane, N-(gamma-triethoxysilylpropyl)propylamine, gamma-aminoallyltriethoxysilane, para-aminophenyltriethoxy silane, N-beta-aminoethyl)-gamma-aminopropyltrimethoxy silane, gamma-chloropropyltrichlorosilane, glycidoxypropyltrimethoxy silane, 2,4-epoxycyclohexylethyltrimethoxy silane, gamma-mercaptopropyltrimethoxy silane, as well as a wide variety of others. It will be understood that the foregoing may be used in the form of the silane, the silanol or the polysiloxane formed by one or more of the foregoing materials.

Instead of organo silicon as described above, use can also be made of Werner complex compounds containing a carboxylato group coordinated with the trivalent nuclear chromic atom, and in which the carboxylato group may also contain an amino group or an expoxy group. Suitable Werner complex compounds include stearato chromic chloride, methacrylato chromic chloride, aminopropylato chromic chloride, glycine chromic complex or glycylato chromic chloride.

The anchoring agents of the type described above are normally employed in an amount within the range of 0.1 to 5 percent by weight of the treating composition.

A forming size embodying the concepts of this invention can be formulated as follows:

EXAMPLE 8

Size Composition

| | Parts by weight |
|---|---|
| Resorcinol-formaldehyde resin | 2 to 10 |
| Butadiene-styrene-vinyl pyridine terpolymer | 20 to 60 |
| Vinyl chloride-vinylidine chloride copolymer latex | 15 to 40 |
| Acrylonitrile-butadiene-styrene terpolymer | 0.2 to 35 |
| Microcrystalline paraffin wax | 5 to 30 |
| Anchoring agent | 0.1 to 5 |

EXAMPLE 9

| | Parts by weight |
|---|---|
| Resorcinol-formaldehyde resin | 2 to 10 |
| Terpolymer | 20 to 60 |
| Dicarboxylated butadiene-styrene resin latex | 15 to 40 |
| Acrylonitrile butadiene-styrene terpolymer | 0.2 to 35 |
| Microcrystalline paraffin wax | 5 to 30 |
| Anchoring agent | 0.1 to 5 |

The solids of the foregoing examples are formulated in the manner described in Examples 1–7 with the exception that the anchoring agent, such as gamma-aminopropyltriethoxy silane, is added to the system after hydrolyzation in aqueous medium, as by use of a quaternary ammonium hydroxide such as tetraethanol ammonium hydroxide or tetramethyl ammonium hydroxide, and that the amount of water is increased for dilution of the solids to an amount within the range of 5–30 percent by weight. When applied as a size, it is possible to achieve a higher loading of the individual coating of the glass fiber surfaces; loading in the amount of 15–40 percent by weight of the sized glass fibers is possible.

The following is a specific example of the formulation to provide a size composition.

EXAMPLE 10

| | Parts by weight |
|---|---|
| Resorcinol-formaldehyde resin (75% solids) | 60 |
| Formalin | 20 |
| Sodium Hydroxide | 1.5 |
| Butadiene-styrene-vinyl pyridine terpolymer (42% solids) | 900 |
| Ammonium hydroxide | 95 |

-Continued

| | Parts by weight |
|---|---|
| Copolymer vinyl chloride and vinylidine chloride | 350 |
| Vultex Wax Emulsion No. 5 (50% solids) | 200 |
| Gamma-aminopropyltriethoxy silane | 7 |

Figure 4:
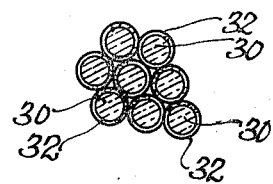
FIG. 4 is a cross-sectional view of glass fibers individually coated with the composition of the invention in accordance with a further embodiment.

Size compositions of the type illustrated in Examples 8 to 10 can be applied in any of a variety of conventional methods. The resulting fibers are shown in FIG. 4 of the drawing as formed with a coating 32 of the size composition on the surfaces of the individual glass fibers 30.

It will be understood that the compositions of Examples 6 and 7 can be modified as described above by formulation to include an anchoring agent for use as a glass fiber size.

When the glass fibers are sized in forming with a composition embodying the modification of this invention, the sized glass fibers remain sufficiently non-tacky due to the acrylonitrile-butadiene-styrene terpolymer for processing directly into yarns, strands, cords or fabrics for use in the combination with the continuous phase elastomer. It is frequently desirable to further treat the coated glass fibers with a phthalate ester as described in Example 3 to further improve the lubricity of the coated glass fibers.

In fabricating the combinations of glass fibers, treated in accordance with the practice of this invention, with elastomeric materials, the glass fibers or bundles of glass fibers are mixed with the elastomeric material or otherwise laid down in the desired arrangement for combination with the elastomeric material, as in the manufacture of glass fiber-reinforced belts or in the manufacture of rubber tires reinforced with cords of glass fibers. The combinations of glass fibers and elastomeric materials are then processed in a conventional manner by molding and cure under heat and pressure or by vulcanization for advancement of the elastomeric materials to a cured or vulcanized state while in combination with the treated glass fibers whereby the bundles of glass fibers become strongly integrated with the elastomeric material in the glass fiber-elastomeric product.

It will be understood that the size compositions, represented by Examples 8 to 10, may also be employed as impregnating compositions, preferably with a lesser dilution by aqueous medium. The anchoring agent will continue to operate to facilitate the bonded relationship or integration between the elastomeric material of the glass fiber treating composition and the glass fiber surfaces.

It will be understood that invention resides not only in the compositions described but also in the process in which the compositions are employed in the treatment of glass fibers as well as the treated or impregnated glass fiber products formed thereof.

It will be understood that changes may be made in the details of formulation and methods of preparation without departing from the spirit of the invention, especially as defined in the following claims.

I claim:

1. A glass fiber bundle formed of a plurality of glass fibers and an impregnant in the bundle, said impregnant comprising 2 to 10 parts by weight of a resorcinol-aldehyde resin, 20 to 60 parts by weight of a vinyl pyridine-butadiene-styrene terpolymer, 15 to 40 parts by weight of a resin selected from the group consisting of a copolymer of vinyl chloride and vinylidene chloride and a dicarboxylated butadiene-styrene copolymer, 5 to 30 parts by weight of an incompatible microcrystalline wax and 1 to 35 parts by weight of a terpolymer of acrylonitrile-butadiene-styrene, said terpolymer of acrylonitrile, butadiene and styrene containing 5 to 25 parts by weight of butadiene per 100 parts by weight of terpolymer and a weight ratio of styrene to acrylonitrile of 0.9 to 2.0.

2. A glass fiber bundle as defined in claim 1 wherein the impregnant also includes a glass fiber anchoring agent.

3. A glass fiber bundle as defined in claim 1 wherein the individual glass fibers forming the bundle have a thin size coating on the surfaces thereof.

4. A glass fiber bundle as defined in claim 1 wherein the glass fibers forming the bundle are in the form of a plurality of strands plied together.

5. A glass fiber bundle as defined in claim 1 wherein the strands are twisted and plied together.

6. Glass fibers having a thin coating on the surfaces thereof, said coating comprising 2 to 10 parts by weight of a resorcinol-aldehyde resin, 20 to 60 parts by weight of a vinyl pyridine-butadiene-styrene terpolymer, 15 to 40 parts by weight of a resin selected from the group consisting of a copolymer of vinyl chloride and vinylidene chloride and a dicarboxylated butadiene-styrene copolymer, 5 to 30 parts by weight of an incompatible microcrystalline wax and 1 to 35 parts by weight of a terpolymer of acrylonitrile, butadiene and styrene, said terpolymer of acrylonitrile, butadiene and styrene containing 5 to 25 parts by weight of butadiene per 100 parts by weight of terpolymer and a weight ratio of styrene to acrylonitrile of 0.9 to 2.0.

7. Glass fibers as defined in claim 6 wherein the coating includes a glass fiber anchoring agent.

8. In a glass fiber-reinforced elastomeric product in which an elastomeric material constitutes a continuous phase in which the glass fibers are distributed, the improvement in the bonding and performance characteristics of the glass fibers comprising a coating on the glass fibers containing 2 to 10 parts by weight of a resorcinol-aldehyde resin, 20 to 60 parts by weight of a vinyl pyridine-butadiene-styrene terpolymer, 15 to 40 parts by weight of a resin selected from the group consisting of a copolymer of vinyl chloride and vinylidene chloride and a dicarboxylated butadiene-styrene copolymer, 5 to 30 parts by weight of an incompatible microcrystalline wax and 1 to 35 parts by weight of a terpolymer of acrylonitrile-butadiene-styrene, said terpolymer of acrylonitrile, butadiene and styrene containing 5 to 25 parts by weight of butadiene per 100 parts by weight of terpolymer and a weight ratio of styrene to acrylonitrile of 0.9 to 2.0.

9. An elastomeric product as defined in claim 8 wherein the glass fibers are distributed in the elastomeric material in the form of individual filaments and the coating is a coating on the individual fiber filaments.

10. An elastomeric product as defined in claim 8 wherein the glass fibers forming the bundle are in the form of strands of glass fibers twisted and/or plied together.

11. An elastomeric product as defined in claim 8 wherein the glass fibers are distributed in the elastomeric material in the form of bundles of glass fibers, and the coating constitutes an impregnant in the bundle.

12. An elastomeric product as defined in claim 8 wherein the individual glass fibers forming the bundles have a thin size coating on the surfaces thereof.

* * * * *